(12) United States Patent
Mestery et al.

(10) Patent No.: US 11,075,857 B2
(45) Date of Patent: Jul. 27, 2021

(54) PEEPHOLE OPTIMIZATION OF LIGHTWEIGHT PROTOCOLS AT LOWER LAYERS

(71) Applicant: Cisco Technology, Inc., San Jose, CA (US)

(72) Inventors: Kyle Mestery, Woodbury, MN (US); Ian Wells, San Jose, CA (US); David Delano Ward, Alleur (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 78 days.

(21) Appl. No.: 16/440,101

(22) Filed: Jun. 13, 2019

(65) Prior Publication Data

US 2020/0396178 A1    Dec. 17, 2020

(51) Int. Cl.
*H04L 12/28*     (2006.01)
*H04L 12/947*    (2013.01)
*H04L 12/931*    (2013.01)
*H04L 29/12*     (2006.01)

(52) U.S. Cl.
CPC ............ *H04L 49/252* (2013.01); *H04L 49/70* (2013.01); *H04L 61/1511* (2013.01); *H04L 61/2015* (2013.01); *H04L 61/6022* (2013.01); *H04L 61/6063* (2013.01)

(58) Field of Classification Search
None
See application file for complete search history.

(56) References Cited

U.S. PATENT DOCUMENTS

| 8,423,672 | B2 | 4/2013 | Liu et al. |
| 9,021,009 | B2 | 4/2015 | Van Biljon et al. |
| 9,288,162 | B2 | 3/2016 | Nellikar et al. |
| 9,461,961 | B2 | 10/2016 | Neerdaels |
| 10,129,201 | B2 | 11/2018 | Sagiraju et al. |

(Continued)

OTHER PUBLICATIONS

Goel, Utkarsh et al, "Faster web through client-assisted CDN server selection", 2015 24th International conference on computer communication and networks (ICCCN), IEEE, 2015, 10 pages.

(Continued)

*Primary Examiner* — Phirin Sam
(74) *Attorney, Agent, or Firm* — Edell, Shapiro & Finnan, LLC

(57) ABSTRACT

Techniques are described to provide a peephole optimization for processing traffic for lightweight protocols at lower layers by executing them inside a virtual switch rather than using the network stack of a host node. In one example, a method includes determining by forwarding logic of a virtual switch that a received packet is associated with a query for one of domain information or address information. Based on such a determination, the virtual switch determines whether the query is contained within a single Ethernet frame and is answerable. Based on a positive determination for both, the virtual switch determines whether a response to the query can be transmitted in a single packet within a single Ethernet frame. Based on a positive determination of a single packet response, a response packet for the query is formed and injected into the forwarding logic for the virtual switch for transmitting to a destination.

20 Claims, 6 Drawing Sheets

(56) References Cited

U.S. PATENT DOCUMENTS

| | | | | |
|---|---|---|---|---|
| 2011/0149737 | A1* | 6/2011 | Muthiah | H04L 47/19 370/235 |
| 2016/0021032 | A1* | 1/2016 | Maier | H04L 49/70 370/401 |
| 2016/0028855 | A1* | 1/2016 | Goyal | H04L 43/10 709/203 |
| 2018/0173557 | A1* | 6/2018 | Nakil | H04L 41/0631 |
| 2018/0205575 | A1* | 7/2018 | Tian | H04L 69/22 |
| 2018/0227195 | A1* | 8/2018 | Dumitriu | H04L 41/145 |
| 2019/0173750 | A1* | 6/2019 | Shaikh | G06F 9/45558 |

OTHER PUBLICATIONS

Unknown, "DNS Protocol Explained", NS1—Intelligent DNS and Traffic Management, 8 pages, downloaded from Internet Mar. 20, 2019.

Unknown, "Domain Name System", Wikipedia, the free encyclopedia, 18 pages, downloaded from Internet Mar. 20, 2019.

Unknown, "Domain Name System (DNS)", Microsoft Docs, 3 pages, downloaded from Internet Mar. 18, 2019.

Alexander et al., "DHCP Options and Bootp Vendor Extensions", Network Working Group, Standard Tracks, Mar. 1997, 34 pages.

Gustafsson, "Handling of Unknown DNS Resource Record (RR) Types", Network Working Group, Standard Track, Sep. 2003, 8 pages.

Cheshire et al., "Multicast DNS", Internet Engineering Task Force, Standard Track, Feb. 2013, 70 pages.

Unknown, "Multicast DNS", Wikipedia, the free encyclopedia, 5 pages, downloaded from Internet Mar. 18, 2019.

Croft et al., "Bootstrap Protocol (BOOTP)", Network Working Group, Sep. 1985, 12 pages.

Mockapetris, "Domain Names—Implementation and Specification", Network Working Group, Nov. 1987, 55 pages.

* cited by examiner

PEEPHOLE OPTIMIZATION OF LIGHTWEIGHT PROTOCOLS AT LOWER LAYERS

TECHNICAL FIELD

The present disclosure relates to network equipment and services.

BACKGROUND

Traffic for lightweight protocols, such as Domain Name System (DNS) queries or Dynamic Host Configuration Protocol (DHCP) queries, are typically the first thing that occurs for service discovery in web pages, Representational State Transfer (REST) calls, Internet Protocol (IP) address assignment, and so on. The cost of a DNS or DHCP request-response process is directly reflected in the latency of the response and is unavoidable. Reducing such latency is 100 percent reflected in the performance of a system and, thus, is a valuable target for optimization.

DESCRIPTION OF EXAMPLE EMBODIMENTS

Overview

Figure 1:
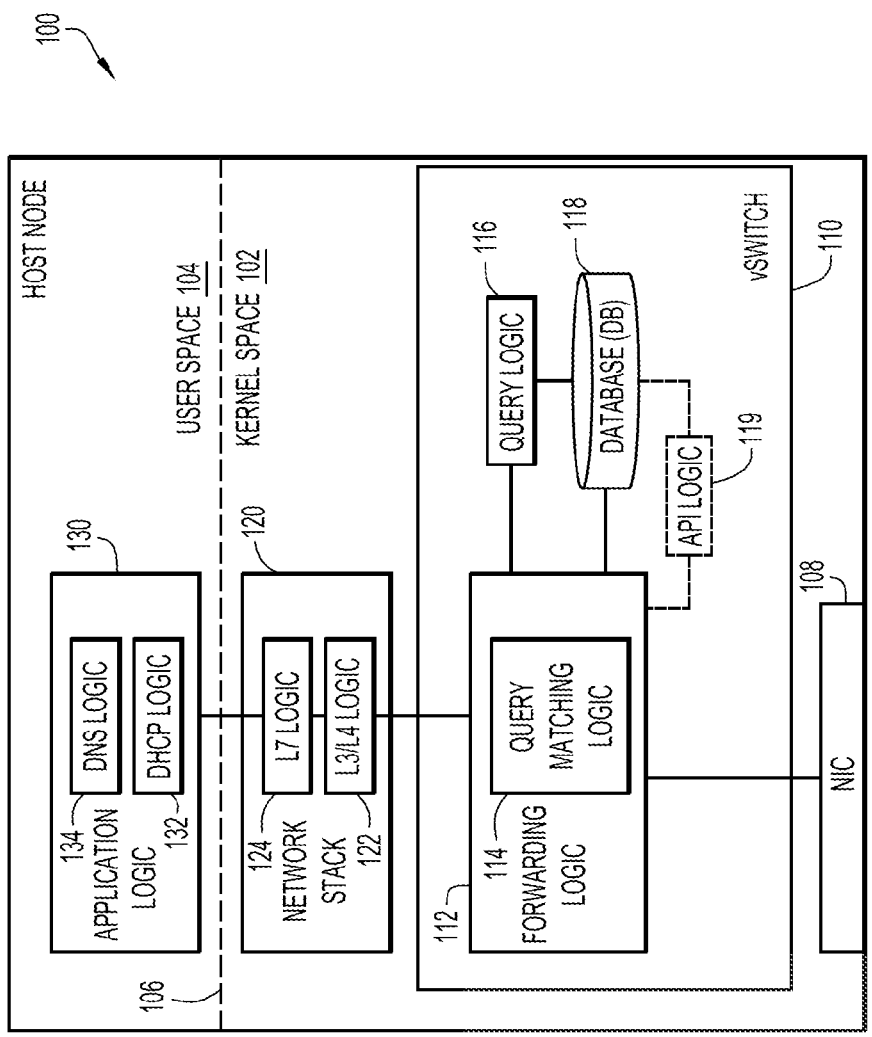
FIG. 1 is a block diagram depicting a host node in which techniques for providing a peephole optimization for processing traffic for lightweight protocols at lower layers may be implemented, according to an example embodiment.

Presented herein are techniques to provide a peephole optimization for processing traffic for lightweight protocols, such as Domain Name System (DNS) queries, Dynamic Host Configuration Protocol (DHCP) queries, among others, at lower layers by executing them, either some of them or part of them, inside a virtual switch (vSwitch) rather than using the host network stack of a host node. In an example embodiment, a method is provided that includes ingesting a received packet directly from a network interface into forwarding logic of a virtual switch for a host node and determining by the forwarding logic of the virtual switch that the received packet is associated with a query, wherein the query is for one of domain information or address information. Based on determining that the received packet is associated with a query, the method includes determining at the virtual switch that the query is contained within a single Ethernet frame and is answerable. Based on determining that the query is contained in a single Ethernet frame and is answerable, the method includes determining at the virtual switch that a response to the query can be transmitted in a single packet within a single Ethernet frame. Based on determining that the response can be transmitted in a single packet within a single Ethernet frame, the method includes forming a response packet for the query, injecting the response packet into the forwarding logic for the virtual switch, transmitting the response packet to a destination via the network interface.

EXAMPLE EMBODIMENTS

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Discussions of protocols and processing associated therewith as described herein may refer to layers of a multi-layered scheme such as the Open Systems Interconnection (OSI) Model (e.g., Layers 1-7), or any derivations or variants thereof. Traffic processing operations may also be discussed in reference to a protocol stack, which may also be referred to as a network stack, a host stack, and variations thereof, and may provide packet processing operations for one or more layers. Internet Protocol (IP) addresses discussed herein and in the claims can include IP version 4 (IPv4) and/or IP version 6 (IPv6) addresses.

Provided herein are processing techniques for traffic associated with 'simple' or lightweight protocols such as, but not limited to, Domain Name System (DNS) traffic and/or Dynamic Host Configuration Protocol (DHCP) traffic. DNS and DHCP traffic is usually User Datagram Protocol (UDP) based. Such traffic may be considered lightweight in terms of sender and receiver processing, as it can be generally predicted that processing such traffic may not use much of the UDP packet processing functionality. Further, such traffic may be considered lightweight in that it is relatively simple to generate and respond to, with some caveats for DNS traffic, as discussed in further detail herein.

In current systems, traffic (packets) for such lightweight protocols may be processed by a host (e.g., a computing device, server, etc.), as follows:

- Packet(s) (encapsulated within Ethernet frame(s)) arrive at the host's network interface card (NIC) and are passed to a virtual switch or forwarding tables.
- The virtual switch or forwarding tables will hand the packet(s) off to the kernel's network stack.
- The kernel's network stack processes the packet(s) (up layers of the network stack) at Layer 3 (L3) (e.g., IP) and Layer 4 (L4) (e.g., Transmission Control Protocol (TCP) and UDP) and assembles TCP streams and UDP packets.
- The kernel will pick the packet up after L3/L4 processing and process Layer 7 (L7) and hand it off to the application which has opened a socket for this packet.
- Finally, the application (in another processing thread) will get the packet, process its contents, and issues a response.
- The return path for the response moves down the layers in reverse to generate outgoing packet(s) for transmission by the host.

As noted above, it can be observed that queries for lightweight protocols such as DNS, DHCP, among others, are typically a UDP query replied to with a UDP response. The host stack of a DNS server brings little value in DNS processing; it is capable of defragmenting Ethernet frames to a larger UDP packet, but the packet is rarely that large; it is capable of responding to TCP requests, but these are rarely used and frequently disabled; it is capable of applying routing to the packet, but typically the DNS server has only one route used for DNS packets.

Traffic such as DNS queries or DHCP queries are typically the first thing that occurs for service discovery in web pages, Representational State Transfer (REST) calls, Internet Protocol (IP) address assignment, and so on. The cost of a DNS or DHCP request-response process is directly reflected in the latency of the response and is unavoidable. Reducing such latency is 100 percent reflected in the performance of a system and, thus, is a valuable target for optimization. For example, this becomes increasingly true with DNS lookups by a DNS server in microservice architectures, such as serverless container architectures, where there is a compounding effect; a first service calls a second, which calls a third, and so on, and each additional call may prompt a DNS lookup, which multiplies the latency effect before a response can be returned.

Presented herein are techniques to optimize processing of lightweight protocol traffic such as Domain Name System (DNS) queries and/or Dynamic Host Configuration Protocol (DHCP) queries by executing them, either some of them or part of them, inside a virtual switch (vSwitch) rather than using the host stack of a host node for processing the queries. In particular, embodiments herein provide a method, device, and system in which optimized processing of lightweight traffic can be provided using a 'peephole optimization' of the process, where sufficiently trivial requests (e.g., for DNS or DHCP) are processed as packets rather than being processed via the host's network stack. Such a peephole optimization may provide optimized processing for lightweight protocol traffic at lower layers (e.g., L2); thereby reducing the latency of processing such traffic. A 'layer' may also be referred to herein as a 'level' for some discussions.

FIG. 1 is a block diagram depicting a host node 100 depicting a host node in which techniques for providing a peephole optimization for processing traffic for lightweight protocols at lower layers may be implemented, according to an example embodiment. Compute resources (e.g., logic, instructions, etc.) for processing operations provided by host node 100 may be implemented via kernel space 102 (also referred herein to as kernel space processing 102) and user space 104 (also referred herein to as user space processing 104). A processing boundary (as represented by dashed-line 106), may represent a separation (e.g., in system memory/storage where kernel/user space logic/processes/etc. are instantiated and executed) between kernel space 102 and user space 104 for host node 100.

Host node 100 may be configured with at least one network interface card 108, a virtual switch (vSwitch) 110, a network stack 120, and application logic 130. The vSwitch 110 may include forwarding logic 112 and query logic 116. Forwarding logic 112 for vSwitch 110 may further include query matching logic 114, query logic 116, and a database (DB) 118. Network stack 120 may include L3/L4 logic 122 and L7 logic 124. In at least one embodiment, vSwitch 110 may further include Application Programming Interface (API) logic 119 for one or more APIs configured for vSwitch 110 and/or host node 100. Logic for other layers (e.g., L5 and L6) may also be configured for network stack 120; however, these are not shown in FIG. 1 in order to illustrate other features associated with host node 100. In at least one embodiment, application logic 130 may be configured with DNS logic 134 and DHCP logic 132.

As illustrated in FIG. 1, NIC 108 may interface directly with forwarding logic 112 of vSwitch 110. Forwarding logic 112 may also interface with query logic 116 and both query logic 116 and forwarding logic 112 may interface with database 118. API logic 119 may interface with forwarding logic 112 and database 118. In some embodiments, API logic 119 may further interface with query logic 116 and/or any other logic and/or interfaces (e.g., NIC 108) of vSwitch 110 and/or host node 100. Although not shown in FIG. 1, query logic 116 and/or any other logic of vSwitch 110 may further interface with network stack 120 and/or application logic 130. Forwarding logic 112 may further interface with network stack 120 via L3/L4 logic 122, which may further interface with L7 logic 124. Network stack 120 may further interface with application logic 130 via L7 logic 124. Processing and operations associated with vSwitch 110 and network stack 120 may be considered kernel space processing 102. Processing and operations associated with application logic 130 may be considered user space processing 104.

In various embodiments, host node 100 may be implemented as one or more computing devices such as servers, routers, switches, gateways, load balancers, firewalls, etc. In general, vSwitch 110 may provide routing and forwarding operations via forwarding logic 112 for traffic received and transmitted by host node 100 via NIC 108 for various virtualization environments, architectures, etc. As discussed for embodiments herein, vSwitch 110 is further enhanced with query matching logic 114, query logic 116, and database 118 in order to facilitate a peephole optimization for processing traffic for lightweight protocols such as DNS, DHCP, among others.

Consider an optimized DNS processing example. In some implementations, a table of potential DNS requests/queries and responses can be stored in the vSwitch 110 via database 118. A DNS matching rule can be configured for query matching logic 114 to identify that a packet is a DNS request. For example, identifying that a packet is IP, UDP, with a destination port set to 53 and with an expected destination (e.g., an address (A) record or a canonical name (CNAME) record stored within database 118) may be sufficient, in some implementations, to determine that it deserves DNS processing via vSwitch 110 as such identification does not involve the full network stack to identify the DNS query.

During operation in some implementations, incoming DNS packets can be identified by the query matching logic 114 of vSwitch 110 and a lookup code can be applied at the packet level (similar to performing a look-up of a next hop from a destination address) to answer the query at lower levels via query logic 116 configured for vSwitch 110; thereby providing optimized processing for DNS queries at low levels. Other logic such as determining whether a response to a query response is simple or complex, as discussed in further detail herein, and or any other logic may also be provided in various implementations for processing DNS queries via vSwitch 110.

During some operations, partially optimized DNS processing may be partially provided at lower levels of vSwitch 110 while complex responses may be handled by application logic 130 (e.g., DNS logic 134) and network stack 120 for processing/forming the response. For example, in some cases, vSwitch 110 via query logic 116 can identify a DNS request but offload the response ('punting') to DNS logic 134 and network stack 120.

In one embodiment, the punting may include forwarding a digested request to a vSwitch 110 client process that creates a fully formed Ethernet frame, an IP packet, or even uses the conventional network stack to generate an outgoing UDP response, which allows for larger and more complex responses. In another embodiment, the vSwitch 110 may be configured with an additional API (e.g., via API logic 119) that allows frame or packet injection or a higher level of the response description that results in packets being created by the vSwitch 110. This could therefore benefit from Generic Segmentation Offload (GSO) in the vSwitch 110 if an entire UDP packet is injected rather than an Ethernet frame.

In still some implementations, vSwitch 110 can be enhanced to generate or provide IP addresses (IPv4 and/or IPv6) to clients in response to DHCP Discovery packets (DHCPDISCOVER) and/or DHCP Request (DHCPREQUEST) packets. For example, in some implementations, IP addresses can be stored in database 118 and/or can be generated by query logic 116 of vSwitch 110 using dynamic, automatic, and/or manual allocation mechanisms as would be understood by one of ordinary skill in the art. A DHCP matching rule can be configured for query matching logic 114 to identify that a packet is a DHCP Discovery packet or a DHCP Request packet. For example, identifying that a packet is IP, UDP, with a destination port=67 and of a certain type (e.g., Discover (Type 1, as provided by Request For Comments (RFC) 2132) or Request (Type 3, as provided by RFC 2132)) may be sufficient, in some implementations, to determine that it deserves DHCP processing via vSwitch as such identification does not involve a full network stack to identify a DHCP query.

During operation in some implementations, incoming DHCP packets can be identified by the query matching logic 114 of vSwitch 110 and a response can be provided at the packet level to answer the query at lower levels via query logic 116 configured for vSwitch 110. For example, vSwitch 110 can generate a DHCP Offer response message for a simple DHCP Discovery message or can generate a DHCP Acknowledge response message for a simple DHCP Request message. Other logic such as determining whether a response to a DHCP Discovery or DHCP Request is simple or complex, as discussed in further detail herein, and or any other logic may also be provided in various implementations for processing DHCP queries via vSwitch 110.

Thus, host node 100 and logic configured for vSwitch 110 (e.g. query matching logic 114 and query logic 116) can provide various advantages by providing a peephole optimization for processing traffic for lightweight protocols at lower layers such that the lack of context switching, kernel space and user space transitions, and so on improves the performance for devices and/or systems in which DNS, DHCP, and/or other lightweight protocol request/response processing. Further, given that the vSwitch 110 is typically run as a real-time thread means that there is no contention with other processes for the processor (e.g., central processing unit (CPU). Additionally, since the answering process can be optimized to the point that it can be performed in a small and fixed-time, provides an acceptable solution within the flow of packets without degrading vSwitch 110 performance for other packets.

Figure 2:
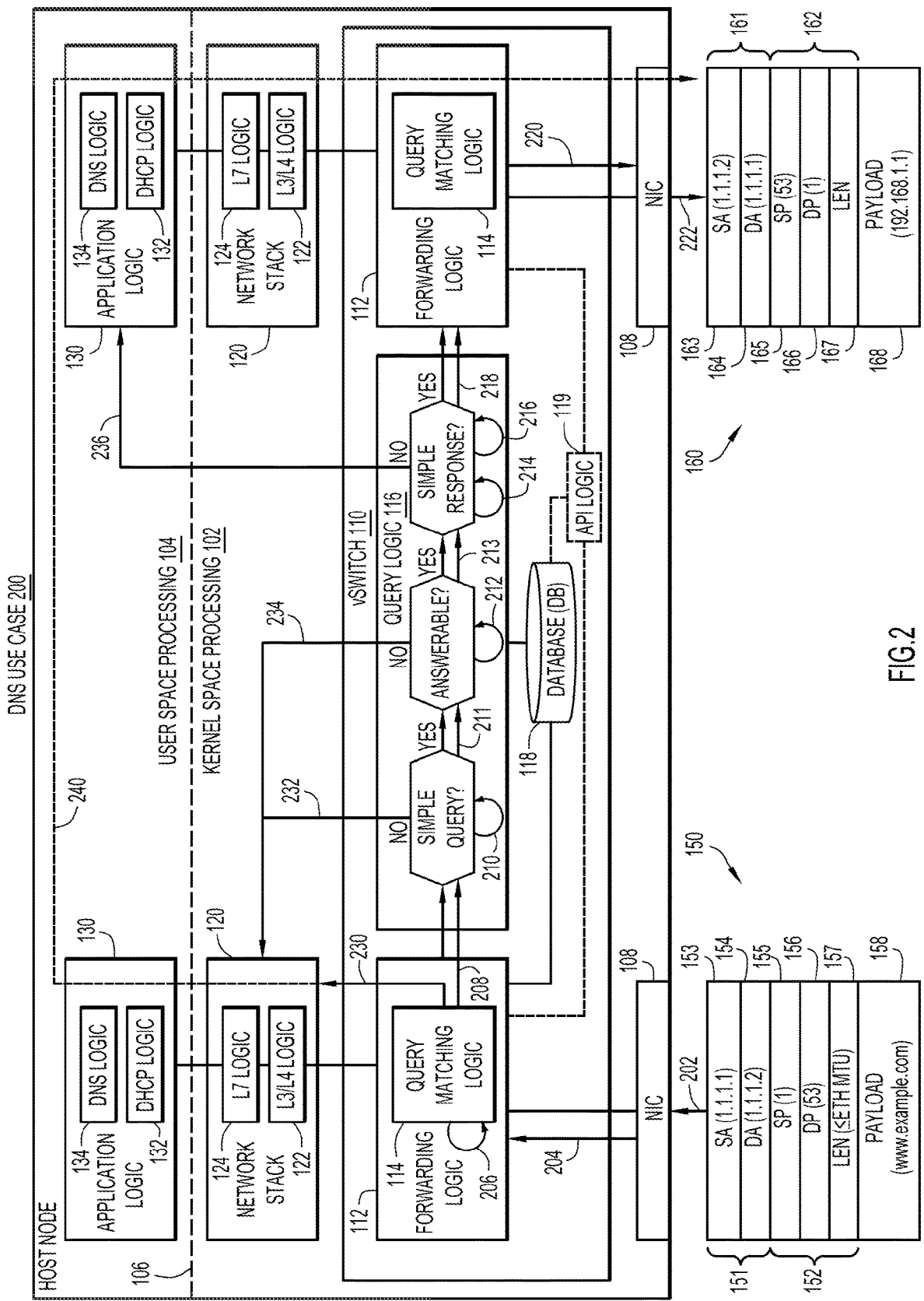
FIG. 2 is a block diagram depicting an example use case in which optimized processing for Domain Name System (DNS) queries may be provided by a virtual switch (vSwitch) for the host node of FIG. 1, according to an example embodiment.

Referring to FIG. 2, FIG. 2 is a block diagram depicting an example use case 200 in which optimized processing of a DNS query can be provided by vSwitch 110 for host node 100. Reference may be made to FIG. 1 in connection with the discussions of FIG. 2.

FIG. 2 illustrates two instances of each of NIC 108, forwarding logic 112 (including query matching logic 114), network stack 120 (including L3/L4 logic 122 and L7 logic 124), and application logic 130 (including DHCP logic 132 and DNS logic 134) for illustrative purposes only in order to discuss various operations that may be associated with processing incoming and outgoing packets by host node 100 and/or vSwitch 110 configured for host node 100.

For the embodiments of FIG. 2, consider that query matching logic 114 is configured with a DNS matching rule to identify an incoming packet as an IP/UDP packet having a destination port set to 53. Further consider that database 118 is configured with resource record (RR) data (RDATA), which includes a plurality of DNS address (A, for IPv4 addresses, or AAAA, for IPv6 addresses) records, DNS canonical name (CNAME) records, DNS text (TXT) records, combinations thereof, and/or any other DNS records for which DNS queries may be expected to be received by host node 100. Any DNS resource record information such as RDATA, RDATA length (RDLENGTH) information, Time-to-Live (TTL) information, Name information, Type information, Class information or any other information that may be included with resource records may be included within database for one or more resource records contained therein. For the embodiment of FIG. 2, consider that database 118 includes an address resource record identifying an IPv4 address '192.168.1.1' corresponding to a CNAME resource record identifying a Uniform Resource Locator (URL) including the alias name or hostname 'www.example.com'. In at least one embodiment, database 118 may further configured to include an IP address (IPv4 and/or IPv6) and Medium Access Control (MAC) address for host node 100.

In at least one embodiment for handling DNS queries, database 118 may be populated with data for one or more resource records using one or more API calls facilitated via API logic 119. API logic 119 may facilitate APIs to both populate and remove entries for database 118 and may expose the APIs to upper layers of host node 100. For example, in at least one embodiment upon initialization of host node 100, database 118 may be empty and DNS queries may be handled by DNS logic 134 for resolution. Upon resolution in the upper layers, the database 118 may be populated through one or more of: explicitly populating the database 118 via an API call from the upper to lower (vSwitch) layer, via the lower layer (e.g., via query logic 116) analyzing the response to the query and populating an entry in database 118 with an appropriate TTL (e.g., to age entries out over time), combinations thereof, or the like. In various embodiments, database 118 may be populated programmatically to read, load, save, etc. resource records (e.g., via a text or script file) either manually or automatically, through any combination of manual and/or automatic configuration, using any combination of explicit API calls, combinations thereof, or the like.

For the embodiment of FIG. 2, consider that a packet 150 is received (202) by NIC and is directly ingested, at 204, by forwarding logic 112 within the same execution context (e.g., within kernel space processing 102) that it was received. Packet 150 includes an IP header 151, a UDP header 152, and a payload 158. Although not illustrated in FIG. 2, it is to be understood that packet 150 can be received by host node 100 encapsulated within an Ethernet frame. Among other fields, IP header 151 includes a source address (SA) field 153 and a destination address (DA) field 154. Among other fields, UDP header 152 includes a source port (SP) field 155, a destination port (DP) field 156, and a length (LEN) field 157.

For the present example, consider that SA field 153 is set to an IP address of '1.1.1.1' for a requestor node (not shown) (e.g., a process, server, device, etc.) that originated the DNS query (packet 150) and DA field 154 is set to an IP address of '1.1.1.2' indicating an IP address of host node 100. Further consider for the present example that DP field 156 is set to a value of fifty-three (53), that a value contained in LEN field 157 identifies a UDP length less than or equal to an Ethernet (Eth) Maximum Transmission Unit (MTU) (e.g., 1500 bytes), and that payload 158 includes a Uniform Resource Locator (URL) set to 'www.example.com', which represents a DNS query for a resource (e.g., device, service, website, etc.) transmitted by the requestor node.

At 206, query matching logic 114 identifies (based on the DNS matching rule) the incoming packet 150 as an IP/UDP packet including the DP field 156 set to a value of 53; thereby identifying packet 150 as a DNS query packet associated with a query for domain information or address information. For cases in which query matching logic 114 does not identify an incoming packet as a UDP DNS query (or some other type of query for which matching rule(s) may be configured for query matching logic 114), forwarding logic 112 can punt, at 230, the incoming packet to network stack 120 and the packet can be processed along a normal processing path (as indicated by dashed-line 240) up the stack 120, by application logic 130, down the stack 120, and by forwarding logic 112 for forwarding output packet(s) to a given destination.

Returning to the present example, based on identifying at 206 that packet 150, is a DNS query packet, query matching logic 114 processing for the packet continues (208) via query logic 116 for further processing by vSwitch 110. At 210, query logic 116 provides for determining whether the DNS query is a simple query (Y) or is not a simple query (N) (e.g., is a complex or multi-packet query).

In at least one embodiment, the determination at 210 may be based on the value contained in LEN field 157 being less than or equal to an Ethernet MTU, which indicates that the DNS query is a single frame/packet query. For example, determining that a UDP length of a DNS query is less than or equal to an Ethernet MTU may be used to determine that a DNS query is a simple (single frame/packet) query; whereas determining a UDP length that is greater than an Ethernet MTU may be used to determine that a DNS query is not a simple query. In another embodiment, the determination at 210 may be based on determining whether the query contains DNS Security Extensions (DNSSEC). For example, determining that a query contains DNSSEC may be used to determine that a DNS query is not a simple query. In still another embodiment, the determination at 210 may be based on determining whether the DNS query is of a certain type, such as an address or CNAME query. Other variations for determining that a DNS query is not a simple DNS query can be envisioned. For cases in which query logic 116 determines that a query is not a simple query (N), query logic 116 can punt the packet, at 232, to the network stack 120 for normal DNS query processing along path 240.

Returning to the present example, based on a positive determination at 210 that the DNS query (contained in packet 150) is a simple query (Y), processing for the packet continues (211) to 212 at which query logic 116 determines whether the DNS query is answerable (Y) or is not answerable (N) by performing a look-up on database 118 using payload 158 contained in packet 150 (a CNAME look-up in this example using 'www.example.com') to determine whether corresponding response information associated with the query, such as resource record information (address resource record 192.168.1.1, in this example) associated with the DNS query for 'www.example.com' is stored within the database 118. Any DNS look-ups or combination of look-ups be utilized for the determination at 212.

A successful look-up on database 118 results in resource record information associated with the query being identified in database 118; while an unsuccessful look-up on database 118 results in no resource information associated with the query being identified in the database. Thus, determining that resource record information is identified in the database 118 for a corresponding look-up can be used as a basis for determining that a query is answerable (Y); whereas determining that resource record information is not identified in the database 118 for a corresponding look-up can be used as a basis for determining that a query is not answerable (N).

For cases in which query logic 116 determines at 212 that a query is not answerable (N) (e.g., a resource record for the query is not contained in database 118), query logic 116 can punt the packet, at 234, to the network stack 120 for normal DNS query processing along path 240.

Returning to the present example, based on a positive determination at 212 that the query is answerable (Y), processing for the packet continues (213) to 214 at which query logic 116 determines whether a DNS response for the DNS query is to be a simple response (Y) or is not to be a simple response (N). The determination at 214 can be based on determining whether the response can be contained in a single packet for a single Ethernet frame. For the present example, consider that the resource record information for the look-up based on 'www.example.com' returns the address resource record of '192.168.1.1' with an RDLENGTH that is less than or equal to 512 bytes.

In general, any CNAME responses, possibly some TXT responses, and any responses fitting within a single packet size may be considered a simple response. In at least one embodiment, the determination at 214 may be based on the RDLENGTH information associated with a resource record. For example, determining at 214 that the RDLENGTH for a resource record is less than or equal to 512 bytes can be used to determine that a response is a simple response (Y); whereas determining that the RDLENGTH is greater than 512 bytes can be used to determine that a response is not a simple response (N). In another embodiment, DNS TXT records greater than a certain size, which may be configurable for query logic 116, may not be considered simple responses and therefore may involve higher level processing (e.g., punting at 236). In yet another embodiment, A and AAAA records greater than a certain size, which may be configurable for query logic 116, may not be considered simple responses and may therefore involve higher level processing (e.g., punting at 236).

For cases in which query logic 116 determines that a DNS response for a DNS query is not to be a simple response (N), query logic 116 can punt, at 236, processing for the response to application logic 130 for normal DNS response processing along path 240 (e.g., by DNS logic 134, down the network stack 120, and further processing by forwarding logic 112 for transmitting DNS response packet(s) to the requestor). Thus, complex responses (e.g., involving multiple packets or some other form of complex processing) may use the host network stack 120 for processing; whereas simple responses can be handled at a lower layer (e.g., L2) by vSwitch 110.

Returning to the present example, based on a positive determination at 214 that the DNS response is to be a simple response (Y), query logic 116 may form, at 216, a single Ethernet frame IP/UDP DNS response packet 160 in which the response packet includes: an IP header 161 containing (among other fields) a SA field 163 and a DA field 164; a UDP header 162 containing (among other fields) a SP field 165, a DP field 166, and a LEN field 167; and a payload 168. For the DNS response packet 160 of the present example, query logic 116 can populate the SA field 163 to include the IP address of host node 100 (e.g., 1.1.1.2), the DA field 164 to include the IP address of the requestor node (e.g., 1.1.1.1), the SP field 165 set to 53, the DP field 166 set to 1, and the payload 168 to include the address resource record '192.168.1.1'. It is to be understood that other information such as the LEN field 167, other resource record information (e.g., TTL, etc.) for payload 168, and/or any other information may be included in a DNS response packet in accordance with various embodiments.

In at least one embodiment, a single frame DNS response packet may be pre-formatted and stored by vSwitch 110 (e.g., within database 118) in which the content/fields of the pre-formatted packet may be updated based on a received DNS query and associated resource record information returned from the look-up at 212.

Once DNS response packet 160 is formed at 216, query logic 116 directly injects, at 218, the DNS response packet 160 into the low level forwarding logic 112, which, without processing the packet further, forwards the DNS response packet 160 to a correct next-hop (e.g., for transmission back to the requestor node, etc.) via NIC 108 at 220 and 222. It is to be understood that the example IP addresses, the source port of the requestor, and the CNAME used for the present example are provided for illustrative purposes only and are not meant to limit the broad scope of the present disclosure.

In at least one embodiment, operations 206, 208, 210, 212, 214, 216, 218, 220, and 222 discussed with reference to FIG. 2 may represent a fully optimized processing path for a peephole optimization for handling DNS requests/queries by host node 100 at a lower layer via vSwitch 110. Identifying incoming packets as simple DNS requests/queries for which simple DNS responses can be provided by host node 100 via vSwitch 110 optimizes processing of such packets by processing them in a same execution context as when they are received without traversing between kernel space processing 102 and user space processing 104 for host node 100.

In at least one embodiment, operations at 206, 208, 210, 212, 214, and 236, in which processing for a complex DNS response is punted to application logic 130 may represent a partially optimized processing path for the peephole optimization for handling DNS requests/queries by host node 100 via vSwitch 110. Thus, different levels of optimizations for processing lightweight protocols may be provided in accordance with embodiments of techniques described herein.

Figure 3:
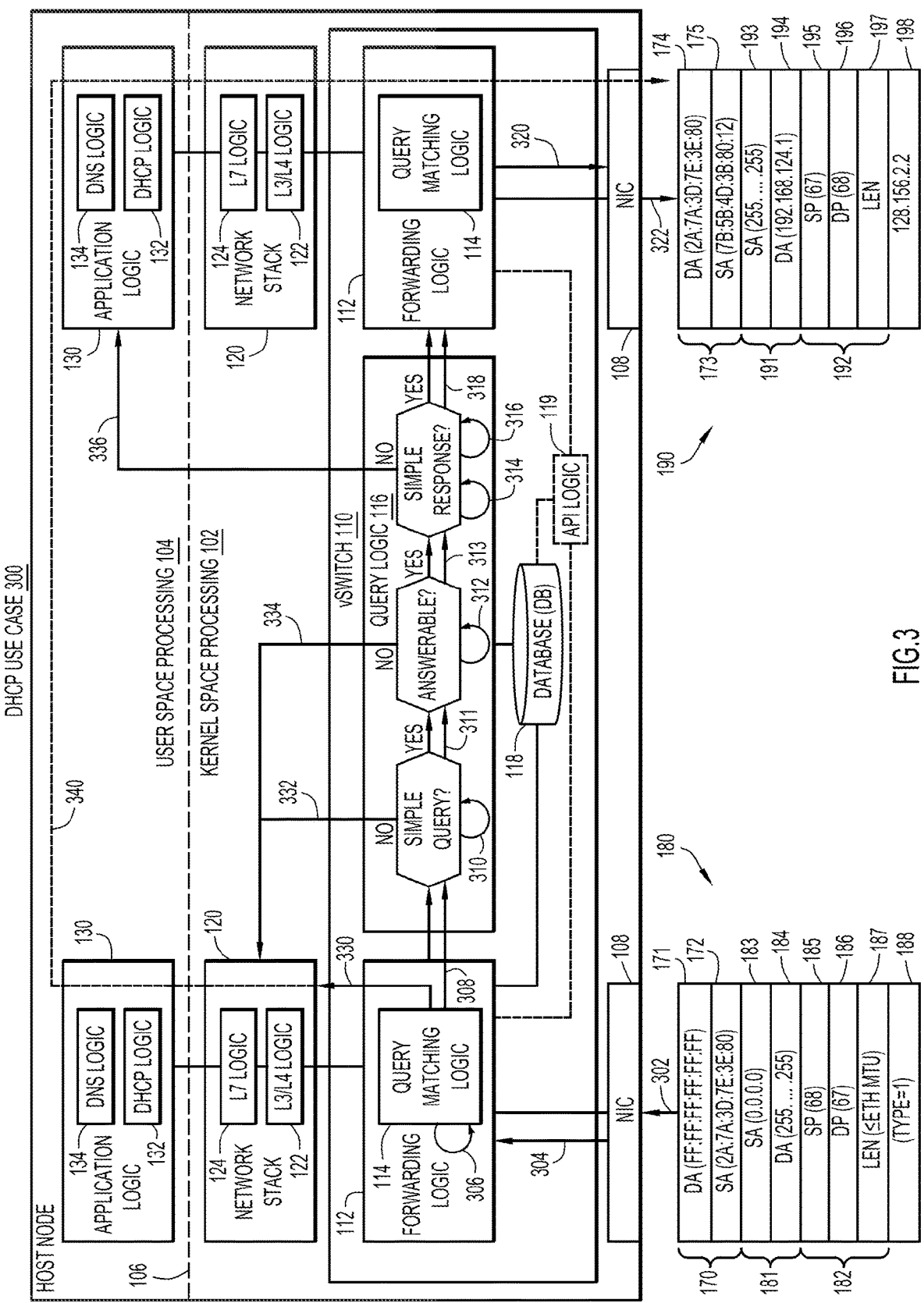
FIG. 3 is a block diagram depicting an example use case in which optimized processing for Dynamic Host Configuration Protocol (DHCP) queries may be provided by a vSwitch for the host node of FIG. 1, according to an example embodiment.

Referring to FIG. 3, FIG. 3 is a block diagram depicting an example use case 300 in which optimized processing for DHCP queries may be provided by vSwitch 110 for host node 100 of FIG. 1, according to an example embodiment. Reference may be made to FIGS. 1 and 2 in connection with the discussions of FIG. 3.

Similar to FIG. 2, FIG. 3 illustrates two instances of each of NIC 108, forwarding logic 112 (including query matching logic 114), network stack 120 (including L3/L4 logic 122 and L7 logic 124), and application logic 130 (including DHCP logic 132 and DNS logic 134) for illustrative purposes only in order to discuss various operations that may be associated with processing incoming and outgoing packets by host node 100 and/or vSwitch 110 configured for host node 100.

For the embodiments of FIG. 3, consider that query matching logic 114 is configured with a DHCP matching rule to identify an incoming packet as an IP/UDP packet having a destination port set to 67. Further consider that database 118 is configured with Medium Access Control (MAC) addresses for clients (e.g., requesting processes, nodes, devices, etc.), IP address information (IPv4 and/or IPv6) being offered to clients, subnet mask information, lease duration information, IP address (IPv4 and/or IPv6) of the server (e.g., host node 100), combinations thereof, and/or any other information that may be associated with DHCP queries (e.g., DHCP Discover, DHCP Request, etc.) and DHCP responses (e.g., DHCP Offer, DHCP Acknowledge, etc.).

In at least one embodiment for handling DHCP queries, database 118 may be populated with data using one or more API calls facilitated via API logic 119. As noted previously, API logic 119 may facilitate APIs to both populate and remove entries for database 118 and may expose the APIs to upper layers of host node 100. In various embodiments, database 118 may be populated programmatically to read, load, save, etc. DHCP entries (e.g., via a text or script file) either manually or automatically, through any combination of manual and/or automatic configuration, using any combination of explicit API calls, combinations thereof, or the like.

For the embodiment of FIG. 3, consider that a packet 180 is received (302) by NIC and is directly ingested, at 304, by forwarding logic 112 within the same execution context (e.g., within kernel space processing 102) that it was received. Packet 180 includes an IP header 181, a UDP header 182, and a payload 188. Packet 180 can be received by host node 100 encapsulated within an Ethernet frame having a frame header 170 including, among other fields, a destination address (DA) field 171 and a source address (SA) field 172. Among other fields, IP header 181 includes a source address (SA) field 183 and a destination address (DA) field 184. Among other fields, UDP header 182 includes a source port (SP) field 185, a destination port (DP) field 186, and a length (LEN) field 187.

For the present example, consider that DA field 171 for the frame header 170 is set to a MAC address of 'FF:FF:FF:FF:FF:FF' and that SA field 172 is set to a MAC address of '2A:7A:3D:7E:3E:80' for a requestor (not shown) (e.g., a process, node, device, etc.) that originated the DHCP query (packet 180, associated with a DHCP Discovery type request, in this example). Further consider that SA field 183 for IP header 181 is set to an IP address of '0.0.0.0' for the requestor node and DA field 184 is set to an IP address of '255.255.255.255'. Further consider for the present example that SP field 185 is set to a value of sixty-eight (68), that DP field 186 is set to a value of sixty-seven (67), that a value contained in LEN field 187 identifies a UDP length less than or equal to an Ethernet (Eth) Maximum Transmission Unit (MTU) (e.g., 1500 bytes), and that payload 188 includes an indication of a DHCP Type=1 indicating that packet 180 is a DHCPDISCOVER message transmitted by the requestor node. It is to be understood that payload 188 may include other information related to the DHCP query. Further consider for the present example that host node 100 has an IP address of '192.168.24.1' and a MAC address of '7B:5B:4D:3B:80:12', which information may be stored within database 118.

At 306, query matching logic 114 identifies (based on the DHCP matching rule) the incoming packet 180 as an IP/UDP packet including the DP field 186 set to a value of 67; thereby identifying packet 180 as a DHCP query associated with a query for address information. For cases in which query matching logic 114 does not identify an incoming packet as a UDP DHCP query (or some other type of query for which matching rule(s) may be configured for query matching logic 114), forwarding logic 112 can punt, at 330, the incoming packet to network stack 120 and the packet can be processed along a normal processing path (as indicated by dashed-line 340) up the stack 120, by application logic 130, down the stack 120, and by forwarding logic 112 for forwarding output packet(s) to a given destination.

Returning to the present example, based on identifying at 306 that packet 180, is a DHCP query packet, query matching logic 114 processing for the packet continues (308) via query logic 116 for further processing by vSwitch 110. At 310, query logic 116 provides for determining whether the DHCP query is a simple query (Y) or is not a simple query (N) (e.g., is a complex or multi-packet query).

In at least one embodiment, the determination at 310 (similar to the determination at 210 for FIG. 2, discussed above) may be based on the value contained in LEN field 187 being less than or equal to an Ethernet MTU, which indicates that the DHCP query is a single frame/packet query. In another embodiment, the determination at 310 may be based on determining whether the DHCP query is a simple type of query, such as a Type 1 (DHCPDISCOVER) query or a Type 3 (DHCPREQUEST) query. For example, determining that a DHCP is a Type 1 or Type 3 query may be used to determine that the query is a simple query at 310; whereas determining that the query is some other type of query and/or a query that includes various extensions, options, etc. as provided by RFC 2132 involving multiple response packets a query may be used to determine that the query is not a simple query. Other variations for determining that a DHCP query is not a simple DHCP query can be envisioned. For cases in which query logic 116 determines that a query is not a simple query (N), query logic 116 can punt the packet, at 332, to the network stack 120 for normal DHCP query processing along path 340.

Returning to the present example, based on a positive determination at 310 that the DHCP query (contained in packet 180) is a simple query (Y), processing for the packet continues (311) to 312 at which query logic 116 determines whether the DHCP query is answerable (Y) or is not answerable (N), in at least one embodiment, by performing a look-up on database 118 using the MAC address for the requestor (e.g., '2A:7A:3D:7E:3E:80') to determine whether response information, such as a corresponding IP address for the requestor (e.g., '128.156.2.2') is stored in database 118. A successful look-up on database 118 results in a corresponding IP address for a MAC address used in the look-up; while an unsuccessful look-up results in no IP address being identified in the database.

In at least one embodiment, the determination at 312 may also include determining whether there are any options (e.g., as provided by RFC 2132) requested for the query that may result in additional processing. For example, determining that no options are requested may result in a determination that a query can be answered locally, whereas, determining that options are requested may result in a determination that a query cannot be answered locally as the options may not be included in the database or the size of the return frame would exceed a single packet.

For cases in which query logic determines at 312 that a query is not answerable (N), query logic 116 can punt the packet, at 334, to the network stack 120 for normal DHCP query processing along path 340.

Returning to the present example, based on a positive determination at 312 that the query is answerable (Y), processing for the packet continues (313) to 314 at which query logic 116 determines whether a DHCP response for the DHCP query is to be a simple response (Y) or is not to be a simple response (N). For the present example, consider that an IP address for the requestor of '128.156.2.2' is returned for the look-up based on the requestor's MAC address of '2A:7A:3D:7E:3E:80' and that the DHCP query did not include any options.

In various embodiments, the determination at 314 can be based on the response involving multiple packets (not contained within a single Ethernet frame), involving other complex processing, combinations thereof, or the like.

For cases in which query logic 116 determines that a DHCP response for a DHCP query is not to be a simple response (N), query logic 116 can punt, at 336, processing for the response to application logic 130 for normal DHCP response processing along path 340 (e.g., by DHCP logic 132, down the network stack 120, and further processing by forwarding logic 112 for transmitting DHCP response packet(s) to the requestor). Thus, complex responses (e.g., involving multiple packets or some other form of complex processing) may use the host network stack 120 for processing; whereas simple responses can be handled at a lower layer (e.g., L2) by vSwitch 110.

Returning to the present example, based on a positive determination at 314 that the DHCP response is to be a simple response (Y), query logic 116 may form, at 316, an IP/UDP DHCP response packet 190 in which the response packet includes: an IP header 191 containing (among other fields) a SA field 193 and a DA field 194; a UDP header 192 containing (among other fields) a SP field 195, a DP field 196, and a LEN field 197; and a payload 198. For the DHCP response packet 190 of the present example, query logic 116 can populate the SA field 193 set to the IP address '255.255.255.255', the DA field 194 set to the IP address of the host node, '192.168.124.1', as may be stored in database 118, the SP field 195 set to 67, the DP field 196 set to 68, and the payload 168 to include the IP address 192.156.2.2 offered to the requestor. The DHCP response packet 190 may be encapsulated within an Ethernet frame having a frame header 173 that includes, among other fields, a DA field 174 set to the MAC address of the requestor ('2A:7A:

3D:7E:3E:80') and a SA field 175 set to the MAC address of host node 100 ('7B:5B:4D:3B:80:12'). It is to be understood that other information may be included in a DHCP response packet in accordance with various embodiments.

In at least one embodiment, a single frame DHCP response packet may be pre-formatted and stored by vSwitch 110 (e.g., within database 118) in which the content/fields of the pre-formatted packet may be updated based on a received DHCP query and associated IP address information determined at 312 and/or any other information that may be stored in database 118.

Once DHCP response packet 190 is formed at 316, query logic 116 directly injects, at 318, the DHCP response packet 190 into the low level forwarding logic 112, which, without processing the packet further, may forward the DHCP response packet 190 to a correct next-hop (e.g., for transmission back to the requestor node, etc.) via NIC 108 at 320 and 322. It is to be understood that the example IP addresses and MAC addresses used for the present example are provided for illustrative purposes only and are not meant to limit the broad scope of the present disclosure.

In at least one embodiment, operations 306, 308, 310, 312, 314, 316, 318, 320, and 322 discussed with reference to FIG. 3 may represent a fully optimized processing path for a peephole optimization for handling DHCP requests/queries by host node 100 at a lower layer via vSwitch 110. Identifying incoming packets as simple DHCP requests/queries for which simple DNS responses can be provided by host node 100 via vSwitch 110 optimizes processing of such packets by processing them in a same execution context as when they are received without traversing between kernel space processing 102 and user space processing 104 for host node 100.

In at least one embodiment, operations at 306, 308, 310, 312, 314, and 336, in which processing for a complex DHCP response is punted to application logic 130 for processing complex DNS responses may represent a partially optimized processing path for the peephole optimization for handling DNS requests/queries by host node 100 via vSwitch 110. Thus, as noted previously, different levels of optimizations for processing lightweight protocols may be provided in accordance with embodiments of techniques described herein.

Figure 4:
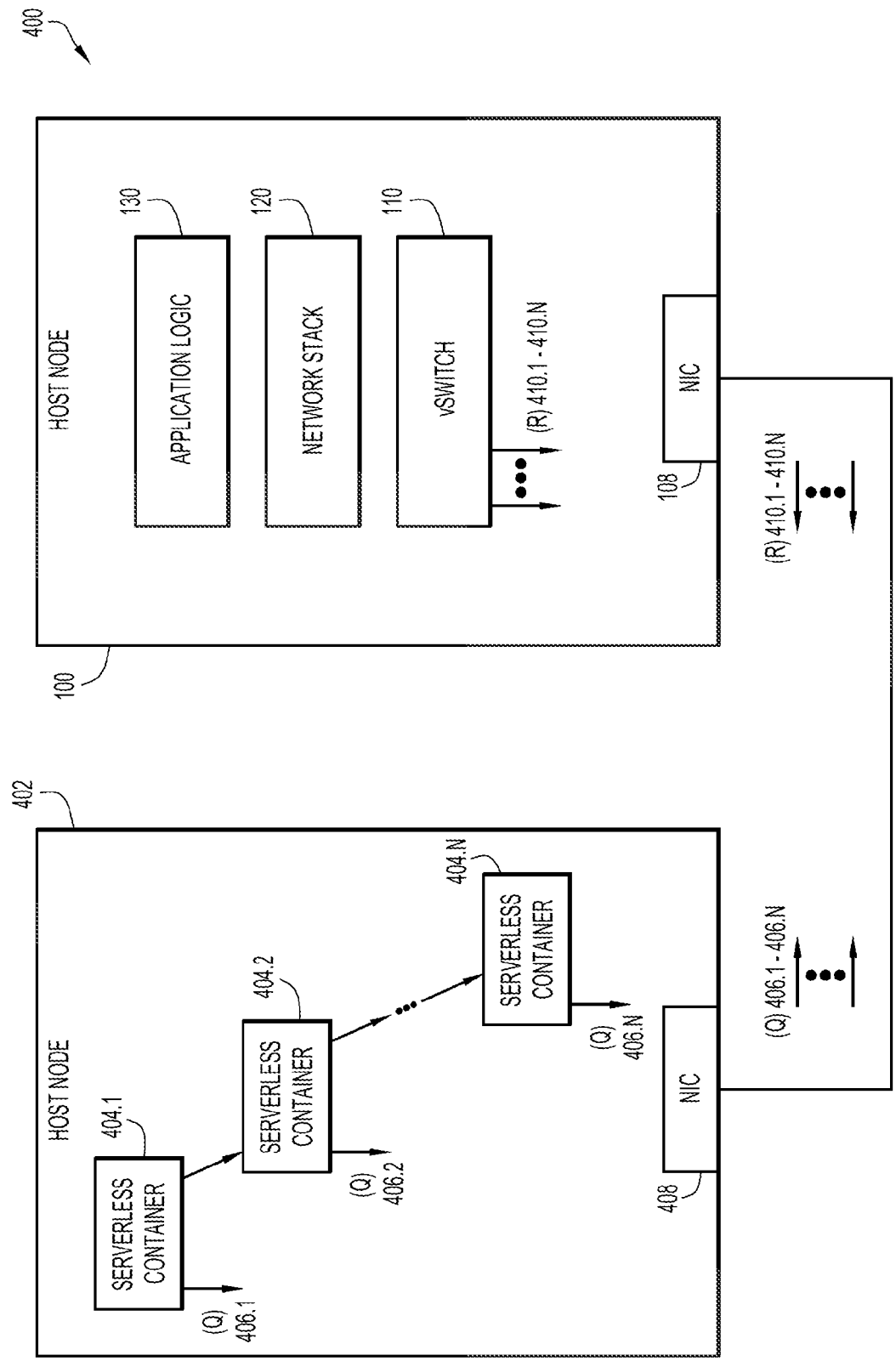
FIG. 4 is a block diagram depicting a network environment in which peephole optimization techniques for processing traffic for lightweight protocols at lower layers may be implemented, according to an example embodiment.

Referring to FIG. 4, FIG. 4 is a block diagram depicting a microservice network environment 400 in which peephole optimization techniques for processing traffic for lightweight protocols at lower layers may be implemented, according to an example embodiment. FIG. 4 includes host node 100 connected to another host node 402 within network environment 400 in which host node 402 may include a NIC 408 and wherein a number of serverless containers 404.1-404.N may be instantiated for host node 402. Host node 100 includes NIC 108, vSwitch 110, network stack 120, and application logic 130. It is to be understood that other logic, databases, etc. are configured for host node 100, as discussed in FIGS. 1-3 (e.g., forwarding logic 112, query matching logic 114, query logic 116, database 118, etc.) but which are not shown in FIG. 4 for purposes of brevity only.

Consider for microservice network environment 400 an example implementation in which a first serverless container 404.1 is instantiated, which causes instantiation of a second serverless container 404.2, which causes instantiation of one or more additional serverless containers 404.N and that each serverless container 404.1-404.N initiates at least one lightweight protocol query (Q) 406.1-406.N, such as a DNS and/or a DHCP query, that may be characterized as a simple query, as discussed for embodiments described herein. For the example implementation, each query 406.1-406.N which may be responded to by vSwitch 110 via corresponding simple responses (R) 410.1-410.N, such as DNS and/or DHCP responses, communicated back to each corresponding serverless container 404.1-404.N from which the initial query originated.

As processing for compounded simple queries (406.1-406.N) and corresponding simple responses (410.1-410.N) for microservice network environment 400 can be handled by vSwitch 110 processing such queries can be reduced in comparison to implementations in which all queries and responses have to be processed up the network stack 120, by application logic 130, and back down the network stack 120 before forwarding to a next-hop. Thus, the peephole optimization provided by vSwitch results in decreased latency for DNS/DHCP processes of a connection event, potentially a large decrease, that can applied repeatedly in microservice environments, such as microservice network environment 400, as the services intercommunicate to process a request.

Figure 5:
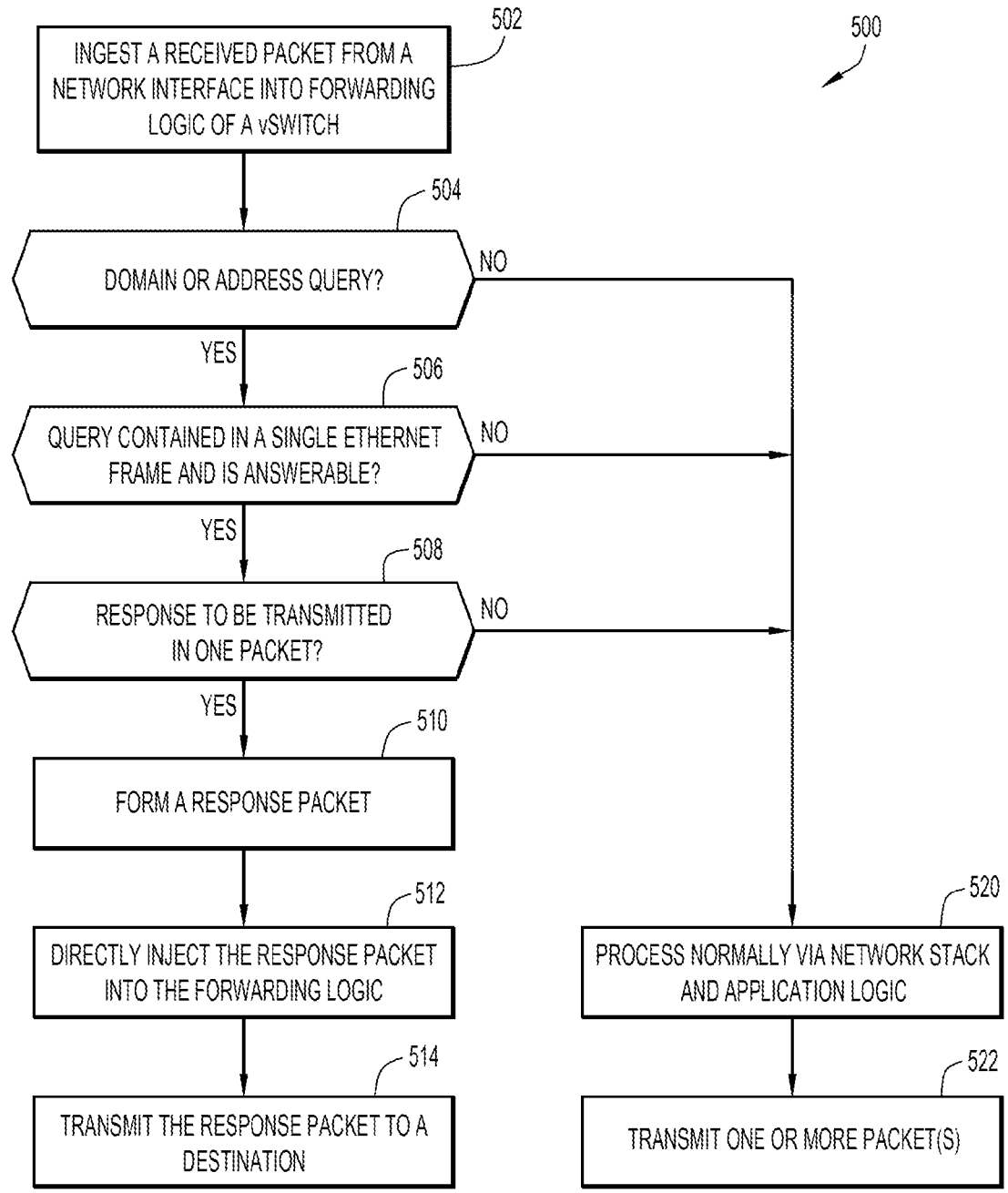
FIG. 5 is a flow chart depicting a method according to an example embodiment.

Referring to FIG. 5, FIG. 5 is a flow chart depicting a method 500 according to an example embodiment. The method 500 may be performed, at least in part, by a virtual switch (vSwitch) of a host node (e.g., vSwitch 110 of host node 100 as shown in FIGS. 1-4) in a network environment (e.g., microservice network environment 400 as shown in FIG. 4).

In at least one embodiment, the method may begin at 502 at which a received packet is ingested directly from a network interface (e.g., NIC 108) into forwarding logic of the vSwitch for the host node. At 504, the forwarding logic determines whether the received packet is a query for one of domain information or address information (e.g., a DNS query, DHCP query, etc.). In at least one embodiment, the determination at 504 can be based on one or more matching rules configured for the forwarding logic to identify whether a received packet is an IP/UDP packet including a certain destination port number, or other predetermined matching information for identifying that the received packet is a query for domain or address information that can be handled by the vSwitch.

Based on a determination at 504 that the received packet is not a query for one of domain information or address information, the method includes, at 520, processing the packet normally via the network stack and application logic of the host node (e.g., the forwarding logic punts the packet to the network stack for normal processing) and transmitting, at 522, one or more packets based on the received packet.

Based on a determination at 504 that the received packet is a query for one of domain information or address information, the vSwitch determines, at 506 (e.g., via query logic 116), whether the query is contained within a single (one) Ethernet frame (e.g., whether the query is a simple query or is not a simple query) and is answerable. Based on a determination at 506 that the query is not contained within a single Ethernet frame and is not answerable, the received packet is processed normally via the network stack and application logic of the host node at 520 and one or more packets are transmitted at 522. However, based on a determination at 506 that the query is contained within a single Ethernet frame and is answerable, the vSwitch determines, at 508, whether a response to the query can be transmitted in a single (one) packet within a single (one) Ethernet frame.

In at least one embodiment, the determination at 506 regarding whether the query is contained within a single Ethernet frame can be based, at least in part, on whether a UDP length contained in the received packet is less than or equal to an Ethernet MTU.

In at least one embodiment, the determination at 506 may further include, in addition to or in lieu of performing a length check, determining whether the query is a certain type of query (e.g., a simple DNS query such as a DNS address or CNAME query, a simple DHCP query such as a DHCP Discovery or a DHCP Request query, or a complex query). In at least one embodiment, the determination at 506 may further include determining whether a response to the query is to be a simple response. For example, based on one or more extensions, options, etc. that may be contained in the query, a determination can be made at 506 as to whether a response to the query will result in a single response packet (simple) or will result in multiple response packets (complex) or other complex processing in which a determination that the response will result in multiple response packets or other complex processing causes the received packet to be processed normally at 520 and one or more packet(s) to be transmitted at 522.

In at least one embodiment, the determination at 506 regarding whether the query is answerable may be based on determining whether a response to the query is contained within a database (e.g., database 118) configured for the vSwitch and/or whether there are any options, extensions, etc. included with the query that may involve higher level processing (e.g., involving multiple response packet(s), etc.). For example, the determination at 506 regarding whether a query is answerable may be based on whether a resource record for a corresponding DNS query is contained within the database (as discussed above for FIG. 2) wherein determining that the query is not answerable causes the received packet to be processed normally at 520 and one or more packets(s) to be transmitted at 522. In another example, the determination at 506 may be based on whether a MAC address and corresponding IP address for a requestor sending DHCP query are stored in a database (e.g., database 118) and/or whether there are any options associated with the query that may involve higher level processing and/or multiple response packets wherein determining that the query is not answerable causes the received packet to be processed normally at 520 and one or more packet(s) to be transmitted at 522.

Referring again to 508, at this step the vSwitch determines whether a response to the query can be transmitted in a single packet within a single Ethernet frame. In at least one embodiment for a DNS query, the determination at 508 may be based on whether a length associated with resource record information (e.g., RDLENGTH) for a DNS response to the DNS query is greater than 512 bytes or involves additional complex processing that will result in multiple DNS response packets being generated. If the DNS response is determined to be less than or equal to 512 bytes or is determined not to involve additional complex processing, the vSwitch can determine that the response can be transmitted in a single packet within a single Ethernet frame. In at least one embodiment for a DHCP query, the determination at 508 may be based on a determination that a DHCP response to the DHCP query involves additional complex processing that will result in multiple DHCP response packets being generated. Other variations can be envisioned.

Based on a determination at 508 that the response to the query cannot be transmitted in a single packet within a single Ethernet frame, the response is processed normally via the network stack and application logic of the host node at 520 and one or more packets are transmitted at 522.

However, based on a determination at 508 that the response to the query can be transmitted in a single packet within a single Ethernet frame, the vSwitch can form a response packet at 510, directly inject the response packet into the forwarding logic at 512, and the response packet can be transmitted at 514, via the network interface, to a destination node.

In summary, techniques described herein may avoid the use of higher layer networking code of a host node, which can be expensive and, in the case of lightweight protocols, may deliver no added value in some cases. Such techniques described herein may be considered a form of a peephole optimization in which, if a packet is identified as one for which processing by the network stack will not benefit, it can be removed and processed at an early stage. This optimizes processing for such packets by processing them closer to where they arrive and taking advantage of being able to efficiently process the packets at a lower layer.

In current systems, a lightweight protocol query, such as a DNS or DHCP query, typically involves traversal of many layers of a protocol (network) stack in order to get a response, and its latency is directly reflected in user experience since it adds to time-to-first-view or time-to-response latency and cannot be avoided. However, for queries associated with lightweight protocols such as DNS, DHCP, among others queries, despite being encapsulated in UDP and IP and being routed as they pass through the host stack, the elements there do not add value; a packet is unlikely to be fragmented, the host is unlikely to have complex routing rules, and using the stack is merely a convention.

Thus, techniques described herein provide that simple, single-frame UDP packets can be identified, removed from the packet stream, and processed by a vSwitch (e.g., vSwitch 110). More complex requests, such as fragmented UDP and TCP, for example, can be forwarded as usual. Thus, some queries are optimized, but other queries can be answered in the usual way.

Accordingly, for lightweight protocol queries such as DNS or DHCP queries—perhaps all queries, or perhaps by optimizing, for instance, queries that comfortably fit in a single Ethernet MTU—removing the stack overhead and vSwitch/kernel/user space context switches, latency involved with timesharing, and so on as provided by techniques described herein directly improves user experience and, by choosing the element of the problem that is solved, can also be done with minimal code. Similar optimizations may be provided for other lightweight protocol queries.

Techniques described herein may add complexity to a vSwitch, but the complexity added is modular (e.g., only applying to specific packet categories) and can be controlled, which means the delivered value, being great, justifies any increased complexity for use cases involving lightweight protocols.

In one form, a computer-implemented method is provided and may include ingesting a received packet directly from a network interface into forwarding logic of a virtual switch for a host node and determining by the forwarding logic of the virtual switch that the received packet is associated with a query, wherein the query is for one of domain information or address information. Based on determining that the received packet is associated with a query, the method may further include determining at the virtual switch that the query is contained within a single Ethernet frame and is answerable. Based on determining that the query is contained in a single Ethernet frame and is answerable, the method may further include determining at the virtual switch that a response to the query can be transmitted in a single packet within a single Ethernet frame. Based on determining that the response can be transmitted in a single packet within a single Ethernet frame, the method may further include forming a response packet for the query, injecting the response packet into the forwarding logic for the virtual switch, and transmitting the response packet to a destination via the network interface.

In at least one embodiment of the method, the query is one of a Domain Name System (DNS) query or a Dynamic Host Configuration Protocol (DHCP) query. In at least one embodiment of the method, determining that the query is contained in a single Ethernet frame and is answerable further includes determining by the virtual switch that a length of the received packet is less than or equal to an Ethernet maximum transmission unit (MTU) to determine whether the query is contained in a single packet, performing, based on information contained in the query, a lookup using a table configured for the virtual switch to determine whether response information associated with the query is contained in the table. In at least one embodiment of the method, the information contained in the query may be one of an Internet Protocol (IP) address, a canonical name, or a Medium Access Control (MAC) address. In at least one embodiment of the method, the response information may be one of an Internet Protocol (IP) address or a canonical name.

In at least one embodiment of the method, determining by the forwarding logic at the virtual switch that the received packet is associated with a query includes determining that the received packet is associated with a Domain Name System (DNS) query by determining that the received packet is an Internet Protocol (IP)/User Datagram Protocol (UDP) packet identifying a destination port equal to 53. In at least one embodiment of the method, determining by the forwarding logic at the virtual switch that the received packet is associated with a query includes determining that the received packet is associated with a Dynamic Host Configuration Protocol (DHCP) query by determining that the received packet is an Internet Protocol (IP)/User Datagram Protocol (UDP) packet identifying a destination port equal to 67.

In at least one embodiment of the method, determining that the query is contained in a single Ethernet frame and is answerable, determining that the response to the query can be transmitted in a single packet within a single Ethernet frame, and forming the response packet are performed by the virtual switch within a same execution context without traversing between kernel space and user space processing resources for the host node.

In another form, one or more non-transitory computer readable storage media encoded with instructions are provided in which, when executed by a processor, cause the processor to perform operations, comprising: ingesting a received packet directly from a network interface into forwarding logic of a virtual switch for a host node; determining by the forwarding logic of the virtual switch that the received packet is associated with a query, wherein the query is for one of domain information or address information; based on determining that the received packet is associated with a query, determining at the virtual switch that the query is contained within a single Ethernet frame and is answerable; based on determining that the query is contained in a single Ethernet frame and is answerable, determining at the virtual switch that a response to the query can be transmitted in a single packet within a single Ethernet frame; based on determining that the response can be transmitted in a single packet within a single Ethernet frame, forming a response packet for the query and injecting the response packet into the forwarding logic for the virtual switch; and transmitting the response packet to a destination via the network interface.

In still another form, an apparatus is provided that at least one memory element for storing data; and at least one processor for executing instructions associated with the data, wherein executing the instructions causes the apparatus to perform operations, comprising: ingesting a received packet directly from a network interface into forwarding logic of a virtual switch for the apparatus; determining by the forwarding logic of the virtual switch that the received packet is associated with a query, wherein the query is for one of domain information or address information; based on determining that the received packet is associated with a query, determining at the virtual switch that the query is contained within a single Ethernet frame and is answerable; based on determining that the query is contained in a single Ethernet frame and is answerable, determining at the virtual switch that a response to the query can be transmitted in a single packet within a single Ethernet frame; based on determining that the response can be transmitted in a single packet within a single Ethernet frame, forming a response packet for the query and injecting the response packet into the forwarding logic for the virtual switch; and transmitting the response packet to a destination via the network interface.

Figure 6:
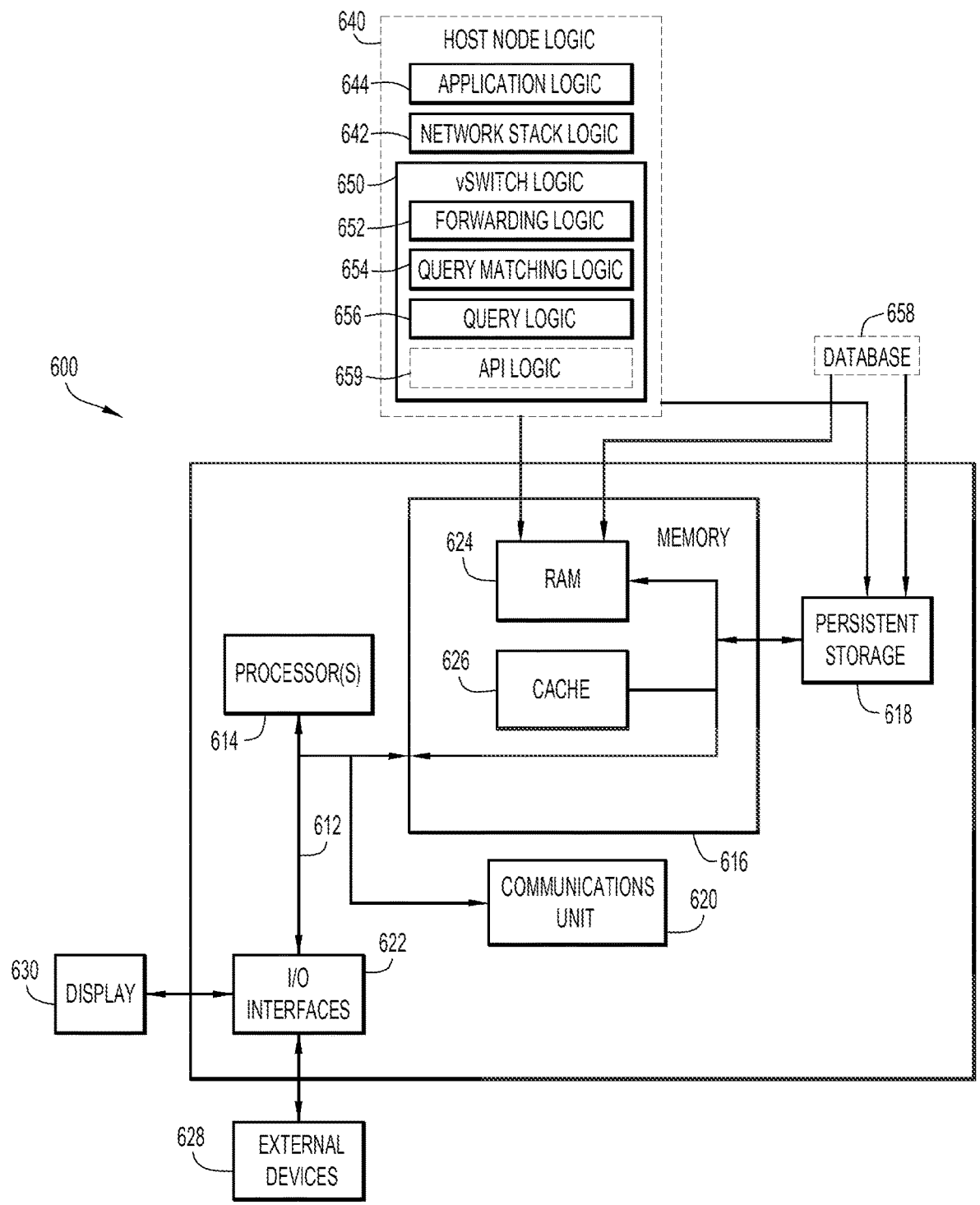
FIG. 6 is a hardware block diagram of a computing device that may perform functions for providing a peephole optimization for processing traffic for lightweight protocols at lower layers, in connection with the techniques depicted in FIGS. 1-5.

Referring to FIG. 6, FIG. 6 illustrates a hardware block diagram of a computing device 600 that may perform the functions of a host node (e.g., host node 100 including vSwitch 110), referred to herein in connection with FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616 includes random access memory (RAM) 624 and cache memory 626. In general, memory 616 can include any suitable volatile or non-volatile computer readable storage media. Instructions for host node logic 640 may be stored in memory 616 and/or persistent storage 618 for execution by processor(s) 614. Host node logic 640 may include network stack logic 642, application logic 644, and vSwitch logic 650, which may further include forwarding logic 652, query matching logic 654, and query logic 656. In at least one embodiment, vSwitch logic 650 may further include API logic 659. Although not shown in FIG. 6, it is to be understood that network stack logic 642 can include L3/L4 logic and L7 logic, as discussed herein, and that application logic 644 can include DNS logic and DHCP logic, as discussed herein. When the processor(s) 614 execute any combination of the host node logic 640 (e.g., any of vSwitch logic 650 (including any combination of forwarding logic 652, query matching logic 654, query logic 656, and/or API logic 659), network stack logic 642, and/or application logic 644), the processor(s) 614 are caused to perform the operations described above in connection with FIGS. 1-5. A database 658 use in association with vSwitch logic 650 may also be stored in memory 616 and/or persistent storage 618 for use during operations described above in connection with FIGS. 1-5.

One or more programs and/or other logic may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622, which may be inclusive of one or more network interface cards (NICs), allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   ingesting a received packet directly from a network interface into forwarding logic of a virtual switch for a host node;
   determining by the forwarding logic of the virtual switch that the received packet is associated with a query, wherein the query is for one of domain information or address information;
   based on determining that the received packet is associated with a query, determining at the virtual switch that the query is contained within a single Ethernet frame and is answerable;
   based on determining that the query is contained in a single Ethernet frame and is answerable, determining at the virtual switch that a response to the query can be transmitted in a single packet within a single Ethernet frame;
   based on determining that the response can be transmitted in a single packet within a single Ethernet frame, forming a response packet for the query and injecting the response packet into the forwarding logic for the virtual switch, wherein determining that the query is contained in a single Ethernet frame and is answerable, determining that the response to the query can be transmitted in a single packet within a single Ethernet frame, and forming the response packet are performed by the virtual switch within a same execution context without traversing between kernel space and user space processing resources for the host node; and
   transmitting the response packet to a destination via the network interface.

2. The method of claim 1, wherein the query is one of a Domain Name System (DNS) query or a Dynamic Host Configuration Protocol (DHCP) query.

3. The method of claim 1, wherein determining that the query is contained in a single Ethernet frame and is answerable further comprises:
   determining by the virtual switch that a length of the received packet is less than or equal to an Ethernet maximum transmission unit (MTU) to determine whether the query is contained in a single packet; and
   performing, based on information contained in the query, a lookup using a table configured for the virtual switch to determine whether response information associated with the query is contained in the table.

4. The method of claim 3, wherein the information contained in the query is one of an Internet Protocol (IP) address, a canonical name, or a Medium Access Control (MAC) address.

5. The method of claim 3, wherein the response information is one of an Internet Protocol (IP) address or a canonical name.

6. The method of claim 1, wherein determining by the forwarding logic at the virtual switch that the received packet is associated with a query includes determining that the received packet is associated with a Domain Name System (DNS) query by determining that the received packet is an Internet Protocol (IP)/User Datagram Protocol (UDP) packet identifying a destination port equal to 53.

7. The method of claim 1, wherein determining by the forwarding logic at the virtual switch that the received packet is associated with a query includes determining that the received packet is associated with a Dynamic Host Configuration Protocol (DHCP) query by determining that the received packet is an Internet Protocol (IP)/User Datagram Protocol (UDP) packet identifying a destination port equal to 67.

8. One or more non-transitory computer readable storage media encoded with instructions that, when executed by a processor, cause the processor to perform operations, comprising:
   ingesting a received packet directly from a network interface into forwarding logic of a virtual switch for a host node;
   determining by the forwarding logic of the virtual switch that the received packet is associated with a query, wherein the query is for one of domain information or address information;
   based on determining that the received packet is associated with a query, determining at the virtual switch that the query is contained within a single Ethernet frame and is answerable;
   based on determining that the query is contained in a single Ethernet frame and is answerable, determining at the virtual switch that a response to the query can be transmitted in a single packet within a single Ethernet frame;
   based on determining that the response can be transmitted in a single packet within a single Ethernet frame, forming a response packet for the query and injecting the response packet into the forwarding logic for the virtual switch, wherein determining that the query is contained in a single Ethernet frame and is answerable, determining that the response to the query can be transmitted in a single packet within a single Ethernet frame, and forming the response packet are performed by the virtual switch within a same execution context without traversing between kernel space and user space processing resources for the host node; and
   transmitting the response packet to a destination via the network interface.

9. The media of claim 8, wherein the query is one of a Domain Name System (DNS) query or a Dynamic Host Configuration Protocol (DHCP) query.

10. The media of claim 8, wherein determining that the query is contained in a single Ethernet frame and is answerable further comprises:
  determining by the virtual switch that a length of the received packet is less than or equal to an Ethernet maximum transmission unit (MTU) to determine whether the query is contained in a single packet; and
  performing, based on information contained in the query, a lookup using a table configured for the virtual switch to determine whether response information associated with the query is contained in the table.

11. The media of claim 10, wherein the information contained in the query is one of an Internet Protocol (IP) address, a canonical name, or a Medium Access Control (MAC) address.

12. The media of claim 10, wherein the response information is one of an Internet Protocol (IP) address or a canonical name.

13. The media of claim 8, wherein determining by the forwarding logic at the virtual switch that the received packet is associated with a query includes determining that the received packet is associated with a Domain Name System (DNS) query by determining that the received packet is an Internet Protocol (IP)/User Datagram Protocol (UDP) packet identifying a destination port equal to 53.

14. The media of claim 8, wherein determining by the forwarding logic at the virtual switch that the received packet is associated with a query includes determining that the received packet is associated with a Dynamic Host Configuration Protocol (DHCP) query by determining that the received packet is an Internet Protocol (IP)/User Datagram Protocol (UDP) packet identifying a destination port equal to 67.

15. An apparatus comprising:
  at least one memory element for storing data; and
  at least one processor for executing instructions associated with the data, wherein executing the instructions causes the apparatus to perform operations, comprising:
    ingesting a received packet directly from a network interface into forwarding logic of a virtual switch for the apparatus;
    determining by the forwarding logic of the virtual switch that the received packet is associated with a query, wherein the query is for one of domain information or address information;
    based on determining that the received packet is associated with a query, determining at the virtual switch that the query is contained within a single Ethernet frame and is answerable;
    based on determining that the query is contained in a single Ethernet frame and is answerable, determining at the virtual switch that a response to the query can be transmitted in a single packet within a single Ethernet frame;
    based on determining that the response can be transmitted in a single packet within a single Ethernet frame, forming a response packet for the query and injecting the response packet into the forwarding logic for the virtual switch, wherein determining that the query is contained in a single Ethernet frame and is answerable, determining that the response to the query can be transmitted in a single packet within a single Ethernet frame, and forming the response packet are performed by the virtual switch within a same execution context without traversing between kernel space and user space processing resources for the apparatus; and
    transmitting the response packet to a destination via the network interface.

16. The apparatus of claim 15, wherein the query is one of a Domain Name System (DNS) query or a Dynamic Host Configuration Protocol (DHCP) query.

17. The apparatus of claim 15, wherein determining that the query is contained in a single Ethernet frame and is answerable further comprises:
  determining by the virtual switch that a length of the received packet is less than or equal to an Ethernet maximum transmission unit (MTU) to determine whether the query is contained in a single packet; and
  performing, based on information contained in the query, a lookup using a table configured for the virtual switch to determine whether response information associated with the query is contained in the table.

18. The apparatus of claim 17, wherein the information contained in the query is one of an Internet Protocol (IP) address, a canonical name, or a Medium Access Control (MAC) address.

19. The apparatus of claim 17, wherein the response information is one of an Internet Protocol (IP) address or a canonical name.

20. The apparatus of claim 15, wherein at least one of:
  determining by the forwarding logic at the virtual switch that the received packet is associated with a query includes determining that the received packet is associated with a Domain Name System (DNS) query by determining that the received packet is an Internet Protocol (IP)/User Datagram Protocol (UDP) packet identifying a destination port equal to 53; and
  determining by the forwarding logic at the virtual switch that the received packet is associated with a query includes determining that the received packet is associated with a Dynamic Host Configuration Protocol (DHCP) query by determining that the received packet is an Internet Protocol (IP)/User Datagram Protocol (UDP) packet identifying a destination port equal to 67.

* * * * *